United States Patent [19]

Makishima et al.

[11] Patent Number: 5,700,508
[45] Date of Patent: Dec. 23, 1997

[54] PROCESS FOR THE MANUFACTURE OF FRIED POTATOES

[75] Inventors: Shinichi Makishima; Keizo Mochizuki, both of Sakado, Japan

[73] Assignee: Meiji Seika Kaisha, Ltd., Tokyo, Japan

[21] Appl. No.: 363,877

[22] Filed: Dec. 27, 1994

[30] Foreign Application Priority Data

Dec. 27, 1993 [JP] Japan .................. 5-331552

[51] Int. Cl.$^6$ .................................. A23L 1/217
[52] U.S. Cl. ............................ 426/441; 426/637
[58] Field of Search ...................... 426/438, 441, 426/637, 808

[56] References Cited

U.S. PATENT DOCUMENTS

| | | | |
|---|---|---|---|
| 3,649,305 | 3/1972 | Wilder | 426/637 X |
| 4,109,020 | 8/1978 | Gorfien | 426/241 |
| 4,219,575 | 8/1980 | Saunders et al. | 426/438 X |
| 4,590,080 | 5/1986 | Pinegar | 426/441 |
| 4,632,838 | 12/1986 | Doenges | 426/438 X |
| 4,839,182 | 6/1989 | Makishima et al. | 426/242 |
| 4,900,576 | 2/1990 | Bonnett et al. | 426/438 |
| 5,393,544 | 2/1995 | Hannah et al. | 426/637 X |

FOREIGN PATENT DOCUMENTS

| | | |
|---|---|---|
| 55-29917 | 3/1980 | Japan . |
| 1-137951 | 5/1989 | Japan . |
| 3-35772 | 2/1991 | Japan .................. 426/438 |
| 1 344 125 | 1/1974 | United Kingdom . |

*Primary Examiner*—Arthur L. Corbin
*Attorney, Agent, or Firm*—Nikaido, Marmelstein, Murray & Oram LLP

[57] ABSTRACT

A process for the manufacture of fried potatoes by using as a raw material potato pieces having a specific gravity of 1.070–1.085 and cut into a thick square pillar or corrugated form. The process includes the steps of cutting a potato having said specific gravity into pieces, dipping the pieces into hot water at a temperature of 60°–70° C. for 5–10 minutes to blanch the same, primary frying the blanched pieces in an edible oil kept at a temperature of 160°–190°C., immediately freezing the fried pieces at a temperature not higher than −20°C., secondary frying the frozen pieces in an edible oil kept at a temperature of 170°–190°C., and drying the fried pieces to obtain final products which have a moisture content of 0.5–5.0% by weight and an oil content of 30–35% by weight.

4 Claims, 3 Drawing Sheets

PROCESS FOR THE MANUFACTURE OF FRIED POTATOES

BACKGROUND OF THE INVENTION (1) Field of the invention

The present invention relates to a process for the manufacture of fried potatoes which have a stick or corrugated form, show a crispy and sorry taste, and can be marketed without a need for refrigeration.

(2) Related arts

Hitherto, there were potato chips, french-fried potato and the like, which are manufactured by washing raw potatoes, paring the same, cutting into pieces, and frying the pieces.

Among them, the potato chips can be manufactured by frying sliced raw potatoes in an edible oil at a temperature of 130°–180° C. Characteristics of the products lie in so called—crispy taste—of from "saku-saku" to "pari-pari" (both indicate imitation sounds in eating) and in that a moisture content thereof is decreased to 0.5–5.0% by weight to allow marketing the same without a need for refrigeration. The french-fried potatoes can be manufactured by frying, in an edible oil at a temperature of about 180° C., potato pieces in a form of square pillar with a cross section of 7×7 mm or more.

Further, various processes for manufacturing fried potato products have been disclosed in U.S. Pat. No. 4,109,020, BP. 1,344,125, Jap. Pat. No. Sho 55 (A.D. 1980) -29917(A), and Hei 1 (A.D..1989) - 137951(A) which corresponds to U.S. Pat. No. 4,839,182.

The conventional french-fried potatoes and thick potato chips have dried states on surface to give a crispy taste, but core portion thereof is wet, so that those can not be marketed without a need for refrigeration and if the products get cold, taste and mouth feeling become remarkably decreased.

In the market, there has been sold a frozen product of french-fried potatoes, which has been prepared by cutting raw potatoes into rectangular strips with cross-section of 5×5 mm, frying the strips, and then freezing the same. If the frozen strips are fried again in an edible oil for a long period of time to dehydrate them to such an extent that they are able to be marketed without a need for refrigeration, a scorching will occur on outer layer to give a hard taste.

Relatively thin potato strips can be formed by cutting the potatoes into rectangular form with 2×2 mm in cross-section. The strips may be made into fried potato strips having a desired crispy taste and a low moisture content to allow their marketing without a need for refrigeration, under frying conditions similar to those for said potato chips. However, it is impossible under such frying conditions for potato chips to prepare fried potatoes having a rectangular shape with a cross-section of 3×3 mm or more, or a thick corrugated form, with the desired crispy taste and a low moisture content to allow their marketing without a need for refrigeration.

In said Jap. Pat. No. Hei 1 (A.D. 1989) - 137951(A) corresponding to U.S. Pat. No. 4,839,182, there is disclosed a method for shortening a frying period of time to suppress a degree of browning by cutting potatoes into sticks or strips, blanching the sticks, par-frying the blanched sticks, freezing the fried sticks, and then subjecting the frozen sticks to secondary frying, while radiating microwaves.

According to the above method, such a product can be obtained that a moisture can be sufficiently removed also from core portion thereof to give a crispy taste. According to the method, however, the microwaves are radiated in the frying apparatus, and thus required expensive equipment for maintaining a stable production and preventing a fire due to a local overheat. For instance, a conventional metallic net conveyor with a reasonable price can not be employed for charging potato sticks into and discharging from the frying apparatus.

SUMMARY OF THE INVENTION

Figure 1:
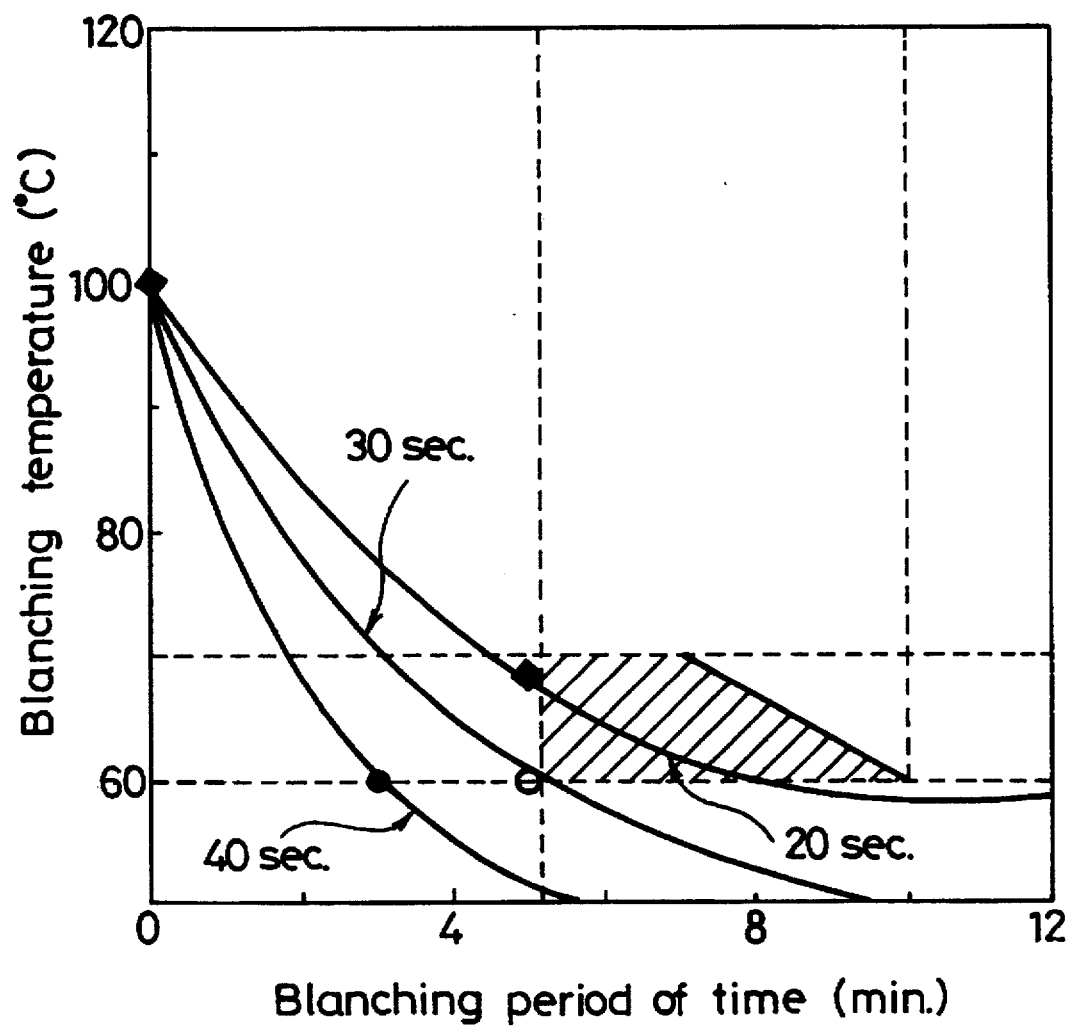
FIG. 1 is a graph showing relations between temperature and period of time for blanching treatment and for providing final products with no hollow texture or structure in cross section, when the subsequent primary frying treatment is carried out at a temperature of 190° C. for 20, 30 or 40 seconds.

The invention has been established to solve the problems in the prior arts, and an object thereof lies in providing a process for the manufacture of fried potatoes with a crispy and soft taste which can be marketed without a need for refrigeration, with use of potato pieces with a thick square pillar or corrugated form.

The inventors have energetically investigated and studied a selection of raw potatoes, conditions for blanching the potato pieces, conditions for primary frying operation, temperature condition for freezing, conditions for secondary frying operation, conditions for drying and so on to find a process for obtaining fried potato products which show a crispy taste, have a low hardness and can be marketed without a need for refrigeration, and without radiating microwaves during the frying operation.

The invention for solving the problems lies in (1) a process for the manufacture of fried potatoes, which comprises steps of cutting potatoes into pieces, blanching the potato pieces by dipping the pieces into hot water at a temperature of 60°–70° C. for 5–10 minutes, primary frying the blanched potato pieces in an edible oil at a temperature of 160°–190° C., immediately freezing the fried pieces by exposing the same to a temperature not higher than −20° C., secondary frying the frozen pieces in an edible oil at a temperature of 170° to 190° C., and drying the resulting fried pieces, so as to make a moisture content and oil content thereof to 0.5–5% by weight and 30–35% by weight, respectively.

In a preferred embodiment, the present invention lies in (2) a process for the manufacture of fried potatoes, which comprises steps of cutting into pieces washed and pared potatoes with a specific gravity of 1.070–1.085, established by a method using a saline, blanching the potato pieces by dipping the same into hot water at a temperature of 60°–70° C. for 5–10 minutes, primary frying the blanched potato pieces in an edible oil at a temperature of 160°–190° C., to make a water content thereof to 69–72% by weight, immediately freezing the fried pieces by exposing the same to a temperature not higher than −20° C., secondary frying the frozen pieces in an edible oil at a temperature of 170° to 190° C., to result in a water content thereof to 8–12% by weight, and drying the resulting fried pieces, so as to make a moisture content and oil content thereof to 0.5–5% by weight and 30–35% by weight, respectively.

DETAILED DESCRIPTION OF THE INVENTION

The invention relates to the process for the manufacture of fried potatoes with a stick form or thick corrugated form having a moisture content of 0.5–5.0% by weight to allow marketing without a need for refrigeration and give a crispy taste. The method uses raw potato pieces having a square pillar form of 3×3 mm–10×50 mm in cross section, or thick corrugated form of 3–10 mm in thickness and 1–10 mm in wave-height.

As the raw potatoes, it is preferable to cut the washed and pared potatoes with a specific gravity of 1.070–1.085, when the specific gravity is measured by a method using saline.

If the specific gravity is less than 1.070, an oil content of final products becomes 40% by weight or more, so that taste thereof is not so good, and the blanching treatment tends to cause a pasting in relatively high degree, so that the final products become hollow one to make low its liking. In case the specific gravity is more than 1.085, structure or texture of the final products becomes dense to give a hard taste, so that its liking is not preferable.

Relations of a specific gravity of raw material of potatoes, a hardness of final products and a liking thereof are shown in following Table 1.

TABLE 1

| Specific gravity | Hardness of final products | Functional score | Opinion on liking |
| --- | --- | --- | --- |
| 1.065 | 1500 | 2 | Oily feeling, bad in liking |
| 1.070 | 2000 | 4 | Soft and crispy, good |
| 1.075 | 3200 | 5 | Crispy and good taste |
| 1.085 | 3600 | 4 | Somewhat hard taste, but good in liking |
| 1.089 | 4500 | 1 | Hard taste, bad in liking |

In the Table, the hardness is given by gram-weight.

In Table 1, the specific gravity of potatoes is given by that of saline, which has a specific value by a concentration of table salt dissolved therein and the raw potato poured into the saline is maintained in a suspension or drifting state, without causing a floating or sinking thereof.

The hardness of products is given by cutting potatoes into square pillar form of 7×7 mm, treating the same in accordance with the process of the invention to prepare the final fried product, puts the product on two supports at a distance of 30 mm on a rheometer (Type NRM-2010J-CW, marketed by Zenken Co., Ltd.), moving a hardness detection plate with a front end surface of 1×10 mm at a velocity of 30 mm/minute to press the product at middle portion of the supports for causing a breaking thereof, and reading out the harness at that time.

The functional score was given by a professional panel (10 members) based on following standards. The opinion on liking was also given by the panel.

| Score | Functional judgement |
| --- | --- |
| 1 | Hard to eat and remarkably bad taste, |
| 2 | Not preferable taste, |

-continued

| Score | Functional judgement |
| --- | --- |
| 3 | Tolerable taste, |
| 4 | Preferable and good taste, and |
| 5 | Crispy and excellent taste. |

The specific gravity of potatoes becomes higher, as a content of starch therein increases. In case of that the specific gravity is higher than 1.085, as shown in Table 1, the content of starch is too high, so that the final products become hard to make low in liking thereof.

While, in case of that the specific gravity is less than 1.070, the content of starch is too low, so that the final products have a coarse texture, are fragile, as apparently seen from the hardness of 1.5 kg-weight, and are not preferable in taste thereof.

However, preferable final products with a crispy taste and having a hardness of 2.0–5.0 kg-weight can be obtained by using potatoes having a specific gravity of 1.070–1.085 which is a selection standard according to the invention.

The potatoes having the specific gravity of 1.070–1.085 are cut. It is preferable to cut the same into a square pillar form of 3×3 mm–10×50 mm in cross section. If the cross section is smaller than 3×3 mm, the final products are similar to those of marketed potato chips which belong neither a stick type snack products nor thick corrugated type snack products. If the cross section is larger than 10×50 mm, the final products could not be marketed without a need for refrigeration and thus are not preferable.

According to the invention, thick corrugated form potato pieces of 3–10 mm in thickness and 1–10 mm in wave-height can also be used. The reason for cutting the potatoes into corrugated pieces with the wave-height of 1 mm or more lies in preventing a freeze adhesion of the potato pieces per se or with a freezer to make difficult the working, in the step for freezing the primary fried potato pieces, and increasing yield of good final products.

The potato pieces are then subjected to the blanching treatment by dipping the same in a hot water of 60°–70° C. for 5–10 minutes. It is preferable to carry out the blanching treatment in a water tank which can control the water in said temperature range.

The blanching treatment is carried out for inactivating an enzyme(s) in the potato, and it is preferable to carry out the same at a temperature of 60° C. or more, since if the temperature is lower than 60° C., the enzyme(s) can not be completely inactivated and thus there is such a fear that blacking of the frozen potato occurs during its storage.

While, if the blanching treatment is carried out at a temperature higher than 70° C., starch component in the potato causes pasting phenomenon, so that the final products show hollow state to give hard taste, which is not preferable in liking.

If a period of time for the blanching treatment is not longer than 5 minutes, the heat of hot water does not reach core portion of the potato pieces to cause sufficient inactivation of the enzyme(s) therein. When the treatment is carried out for longer than 10 minutes, the pasting of starch component in the potato shall occur, so that the final products show hollow state to give a hard taste, which is not preferable in liking.

The blanched potato pieces are then subjected to the primary frying treatment. As the oil for the frying treatment, an animal or vegetable edible oil can be used.

The primary frying treatment is carried out by dipping the blanched potato pieces in a frying chamber accommodating the edible oil pre-heated a temperature of 160°–190° C.

It is preferable that a moisture content of the primary fried potato pieces is 69–72% by weight. When the primary fried potato pieces having a moisture content of less than 69% by weight is subjected to subsequent steps of freezing, secondary frying and drying to obtain final products having a moisture content of 0.5–5% by weight, the final products tend to have hollow core structure, which are not good in taste, although a cause thereof is not apparent. When the primary fried potato pieces have a moisture content higher than 72% by weight, yield of the final products decreases and the final products also show hollow state to give a bad taste, although a cause thereof is also not apparent.

When the oil temperature for the primary frying treatment is lower than 160° C., a period of time for making a moisture content of the primary fried potato pieces to 69–72% by weight becomes longer, and final products show hollow state to give a bad taste. When the oil temperature for the primary frying treatment is higher than 190° C., a moisture in the blanched potato pieces is too rapidly vaporized, so that final products show hollow state to give a bad taste.

In following Table 2, there are shown relations between the conditions for the primary frying treatment and the moisture content of the primary fried potato pieces.

TABLE 2

| Treating period of time | Frying temperature | | | | | |
|---|---|---|---|---|---|---|
| | 155 | 160 | 170 | 180 | 190 | 195 |
| 10 | 85 | 83 | 82 | 80 | 79 | 77 |
| 20 | 83 | 81 | 79 | 75 | 73 | 71 |
| 30 | 81 | 78 | 75 | 70 | 69 | 66 |
| 40 | 79 | 76 | 72 | 68 | 66 | 62 |
| 50 | 77 | 72 | 69 | 65 | 62 | 58 |
| 60 | 76 | 70 | 67 | 63 | | |
| 70 | 75 | 68 | 65 | | | |
| 80 | 74 | | | | | |
| 90 | 73 | | | | | |
| 100 | 72 | | | | | |

In Table 2, the treating period of time is given by seconds from the time when the blanched potato pieces are dipped into the frying chamber, to the time when the fried potato pieces are taken from the chamber. The frying temperature is an oil temperature in the chamber and given by °C.

Other numerals in the Table show a moisture content of the fried potato pieces given by % by weight. The moisture content was measured by weighing the fried potato piece in a constant amount, as a sample, drying the sample in a vacuum dryer under a condition of 5 mmHg for 2 hours, weighing the dried sample, calculating a reduction weight, dividing the reduction weight by the weight prior to the drying, and multiplying a resulting value by 100 to make into % by weight value.

As apparently seen from Table 2, a time period required for attaining the desired moisture content of 69–72% by weight is more than 50 seconds and less than 70 seconds at the oil temperature of 160° C., more than 40 seconds and less than 60 seconds at 170° C., more than 25 seconds and less than 40 seconds at 180° C., and more than 20 seconds and less than 30 seconds at 190° C.

The relations between the conditions for the primary frying treatment and the moisture content of the primary fried potato pieces have been apparent as shown in Table 2, but it is further required to make apparent relations of the oil temperature for primary frying treatment, frying period of time therefor, blanching temperature, and blanching period of time, for obtaining desired final products having a desired texture of no hollow portion therein and showing a good taste. Results of the studies are shown in FIGS. 1–3.

Figure 2:
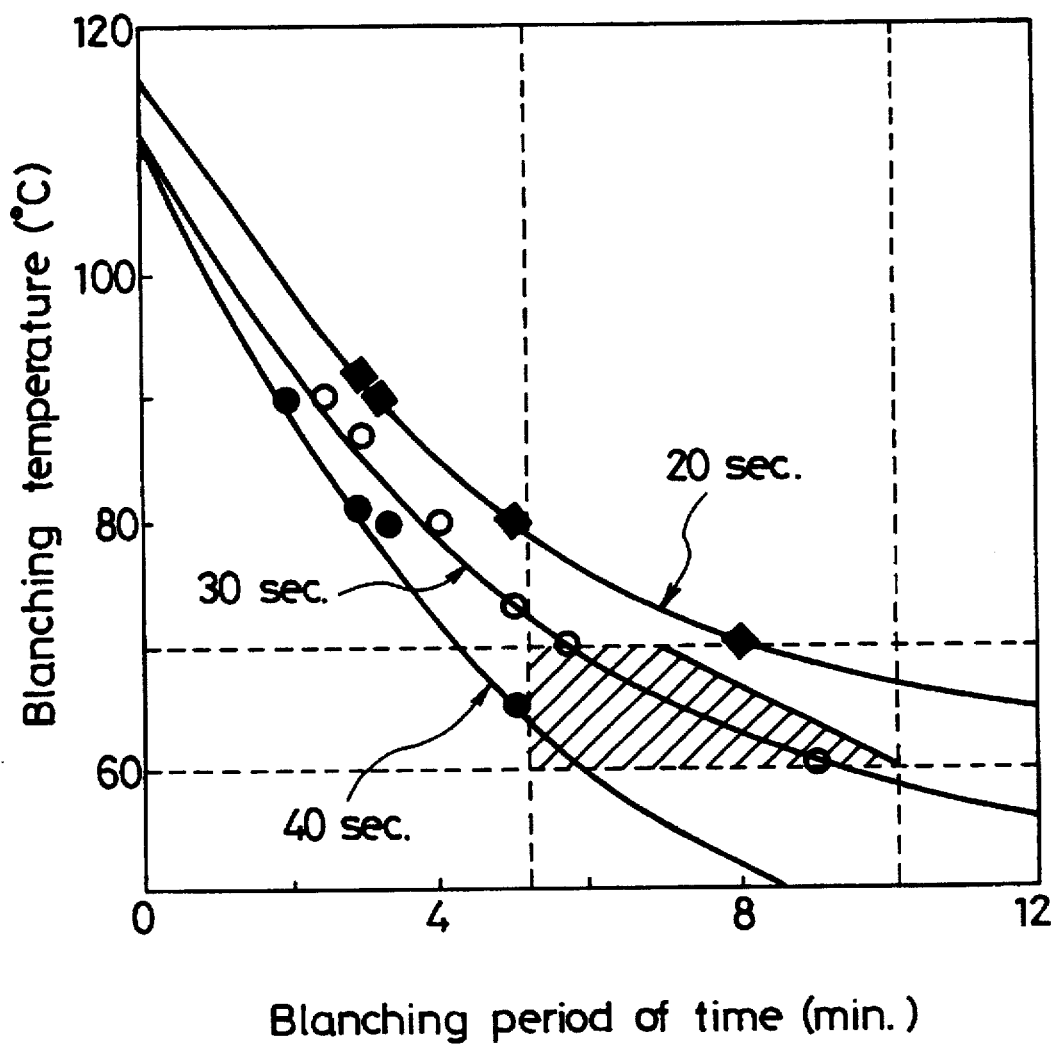
FIG. 2 is a graph similar to FIG. 1, but when the primary frying treatment is carried out at a temperature of 180° C.
Figure 3:
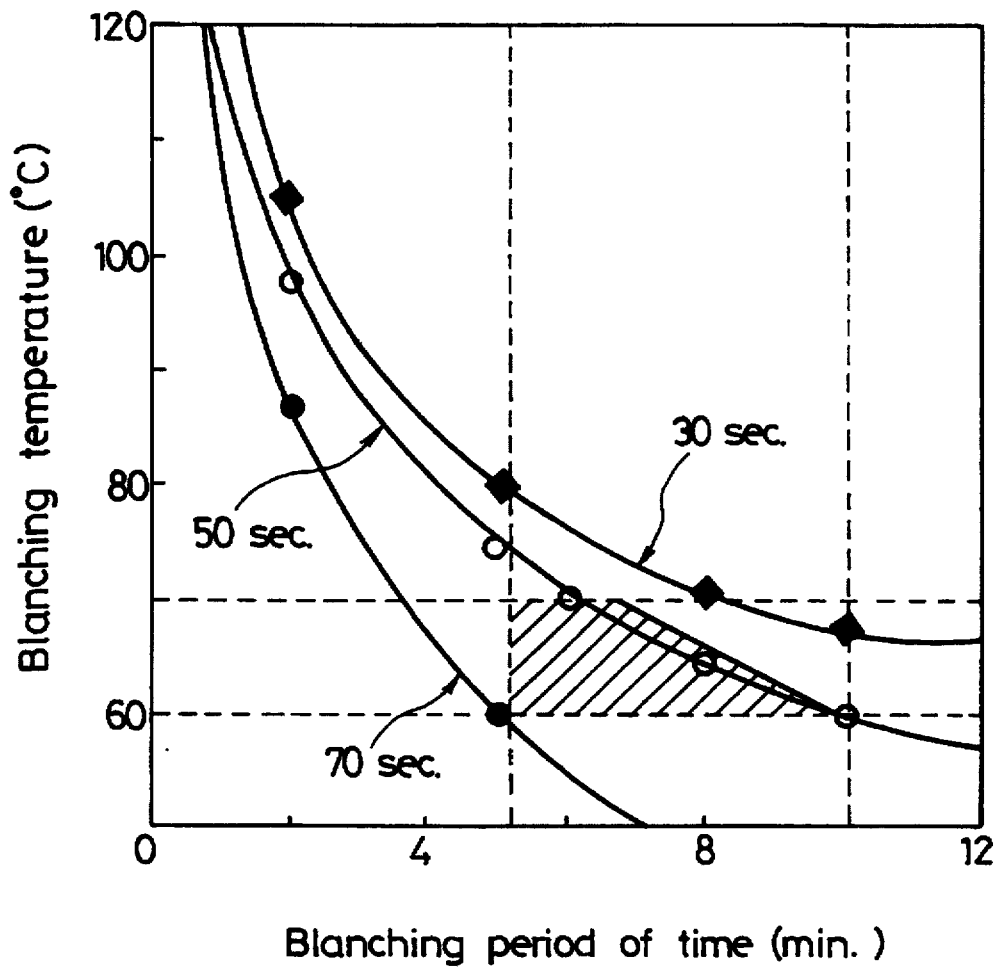
FIG. 3 is a graph similar to FIG. 1, but when the primary frying treatment is carried out at a temperature of 160° C. for 30, 50 or 70 seconds.

Each of the FIGS. 1–3 shows results when the oil temperature for the primary frying treatment is different. In the Figures, the blanching period of time is the period of time for dipping the potato pieces in hot water, and given by minutes. The blanching temperature is the temperature of hot water, and given by °C. Curves in each Figure are formed by drawing a line along points showing critical conditions for the blanching treatment, which give undesired final products with hollow structure, when the blanched potato pieces are subjected to subsequent steps of the primary frying at a predetermined oil temperature, freezing, secondary frying, and drying. In other words, desired final products with crispy taste can be prepared by selecting the blanching conditions in the area under the curve.

FIG. 1 shows the desired blanching conditions when the blanched potato pieces are then subjected to the primary frying treatment at oil temperature of 190° C.

According to the results shown in FIG. 1, it is preferable to set the blanching period of time to 5–10 minutes, when the treating temperature is 60° C. In case the treatment is carried out at 70° C., it is preferable to set the blanching period of to more than 5 minutes and less than 7 minutes. When the blanching treatment is carried out at a temperature higher than 60° C. and lower than 70° C., an optimum blanching period of time for obtaining the desired crispy final products is in a range laying under the curve and in a hatched trapezoid.

FIG. 1 shows the blanching conditions when the primary frying treatment is carried out at a temperature of 190° C. for 20, 30 or 40 seconds. In the Figure, the curves on the frying treatment for 20 and 30 seconds pass through the optimum area. However, it is not preferable to set the frying period of time to 20 seconds or less, since the moisture content of primary fried potato pieces does not reach the desired range. The Figure also shows that the blanching period of time is preferable to set to 5 minutes, when the blanching temperature is 60° C. In that case, the frying period of time is 40 seconds, the blanching period of time becomes 3 minutes at 60° C. and in addition, the sufficient inactivation of enzyme (s) can not be effected. In case of that the oil temperature for primary frying treatment is 190° C. Therefore, the frying time period of longer than 20 seconds and shorter than 30 seconds is to be selected for providing the desired final products showing a good crispy taste and having no hollow texture or structure therein.

FIG. 2 shows the blanching conditions when the primary frying treatment is carried out at a temperature of 180° C. for 20, 30 or 40 seconds. In this case, the optimum blanching condition range lies in the hatched area but under a line connecting points of 60° C.—10 minutes and 70° C.—7 minutes, when the frying period of time is set to longer than 25 seconds and shorter than 40 seconds. While, the frying period of time is set to 40 seconds, the hatched area under the curve is optimum range.

FIG. 3 shows the blanching conditions, when the primary frying treatment is carried out at a temperature of 160° C. for 30, 50 or 70 seconds. In this case, the optimum blanching condition range lies in the hatched area but between the curves for 50 and 70 seconds cases in frying period of time. When the frying period of time is shorter than 50 seconds, the moisture content of the primary fried potato pieces becomes higher than 72% by weight, so that desired final products can not be obtained.

The primary fried potato pieces are immediately subjected to the freezing treatment. It is preferable to carry out the freezing treatment under a temperature condition of not higher than −20° C. If the treatment is carried out at a temperature high than −20° C., the potato pieces shrink to cause lowering in taste of the final products. The frozen potato pieces may be stored under conditions similar to those for conventional frozen foods.

The frozen potato pieces are then subjected to the secondary frying treatment. It is preferable to carry out the treatment at a temperature of 170°–190° C. for 8–10 minutes. The secondary fried potato pieces treated under such conditions shows a oil content of not higher than 35% by weight and moisture content of 8–12% by weight.

Relations of the frying period of time as well as oil and moisture contents of the fried potato pieces are shown in following Table 3.

TABLE 3

| Frying time period (min.) | Moisture content (% by weight) | Oil content (% by weight) |
| --- | --- | --- |
| 5 | 25 | 25 |
| 6 | 20 | 28 |
| 8 | 12 | 30 |
| 10 | 8 | 35 |
| 12 | 5 | 45 |

The moisture content was measured described as referred to on Table 2. The oil content was measured with use of Soxhlet's extractor and ethyl ether, as an extraction solvent.

It is preferable to control the oil content in a range of 30–35% by weight for obtaining the final products with desired taste, since if the oil content is less than 30% by weight, the flavor inherent to fried potato is poor and more than 35% by weight, an excess oily taste is not fit to liking of young persons.

Then, the secondary fried potato pieces are subjected to drying treatment to decrease the moisture content to 0.5–5% by weight to allow marketing without a need for refrigeration. The drying can be carried out by feeding hot air or radiating microwaves, but hot air is preferable as discussed in the Item of "Related Arts". The resulting stick or thick corrugated type final products can be marketed without a need for refrigeration, have nice crispy taste, and have high liking.

The invention shall be explained in more detail.

One of shapes or configurations of potato pieces is a square pillar form of 3×3 mm to 10×50 mm in cross section. The potato pieces are blanched in hot water at a temperature of 60°–70° C. for 5–10 minutes. Optimum conditions for blanching are selected by taking conditions of temperature and period of time for the subsequent primary frying treatment.

The temperature and period of time for the primary frying treatment are controlled, so that primary fried potato pieces have a moisture content of 69–72% by weight for obtaining final products with no hollow texture or structure therein.

In following Table 4, there are shown relations of temperature and period of time for the blanching treatment, temperature and period of time for the primary frying treatment, moisture content of the primary fried potato pieces, and hardness of the final products as well as results of functional evaluation.

TABLE 4

| Sample Number | Blanching treatment | | Primary frying treatment | | Moisture content | Hardness of final product | Functional evaluation |
| --- | --- | --- | --- | --- | --- | --- | --- |
| | Temperature | Period of time | Temperature | Period of time | | | |
| 1 | 70 | 7 | 155 | 100 | 72 | 8.50 | No good |
| 2 | 60 | 5 | 160 | 70 | 72 | 3.50 | Good |
| 3 | 70 | 7 | 180 | 25 | 71 | 3.80 | Good |
| 4 | 60 | 10 | 180 | 25 | 70 | 3.90 | Good |
| 5 | 60 | 9 | 180 | 30 | 69 | 3.50 | Good |
| 6 | 65 | 7 | 180 | 30 | 68 | 3.00 | Good |
| 7 | 62 | 5.5 | 180 | 40 | 69 | 3.10 | Good |
| 8 | 70 | 8 | 180 | 40 | 68 | 10.00 | No good |
| 9 | 60 | 8 | 190 | 30 | 68 | 3.80 | Good |
| 10 | 67 | 5 | 190 | 29 | 68 | 3.60 | Good |
| 11 | 60 | 5 | 190 | 40 | 66 | 8.70 | No good |
| 12 | 60 | 5 | 190 | 20 | 72 | 3.70 | Good |

In Table 4, the temperature for blanching treatment is that for hot water in the blanching tank and given by °C., and the time is that from dipping the raw potato pieces into the tank to taking out the same from the tank and given by minutes. The temperature for primary frying treatment is that of oil in the frying chamber and is given by °C., and the time is that from dipping the blanched potato pieces into the oil in the chamber to taking out the same from the oil and is given by seconds. The moisture content is that of primary fried potato pieces and was measured by the method described on Table 2. The hardness of final products was measured by the method described on Table 1.

As shown in Table 4, the desired final products having a moisture content of 0.5–5% by weight and hardness not higher than 5 kg-weight, giving a crispy taste, and marketable without a need for refrigeration can be obtained by selecting an optimum combination on the blanching and primary frying treatments.

EXAMPLES

Example 1

Washed potatoes were poured into a solution of previously prepared saline having a specific gravity of 1.075 for selecting those with a specific gravity of 1.075 to be employed as a raw material, by removing the potatoes floated on and sunk in the saline and collecting the potatoes drifting in the saline.

The collected potatoes were peeled off by a rotary drum and cut into pieces in the form of square pillar having 7×7 mm in cross section. The potato pieces were dipped into hot water kept at 60° C. for 8 minutes for blanching and then drained on a net.

The potato pieces were subjected to a primary frying treatment by dipping the potato pieces in an edible oil controlled at 180° C. for 30 seconds.

The primary fried potato pieces (moisture content:70% by weight) were immediately subjected to a rapid freezing treatment by applying air at −20° C. The frozen potato pieces were preserved in a cold stock-room kept at −20° C.

Some of the frozen potato pieces were taken out from the cold stock-room and subjected to a secondary frying treatment by dipping the same in an edible oil kept at 180° C. and heating to prevent a lowering of the oil temperature for 8 minutes. A sampling test on the secondary fried potato pieces showed a moisture content of 10% by weight, no hollow portion, uniform and good texture in cross section.

The secondary fried potato pieces were charged into a dryer able to radiate microwaves and preheated at 160° C. until a moisture content thereof becomes 1.0% by weight, by concurrently carrying out operations of feeding hot air at 160° C. and radiating the microwaves to obtain final products.

A sampling test on the final products showed a hardness of 3.0 kg-weight, oil content of 32% by weight, uniform, no hollow portion, and good texture in cross section, and crispy taste.

The final products were subjected to functional liking test by a professional panel (10 members). All members have reported that the fried potato products have no excess oily flavor, and that those have crispy and excellent taste (Functional score:5).

Example 2

Figure 4:
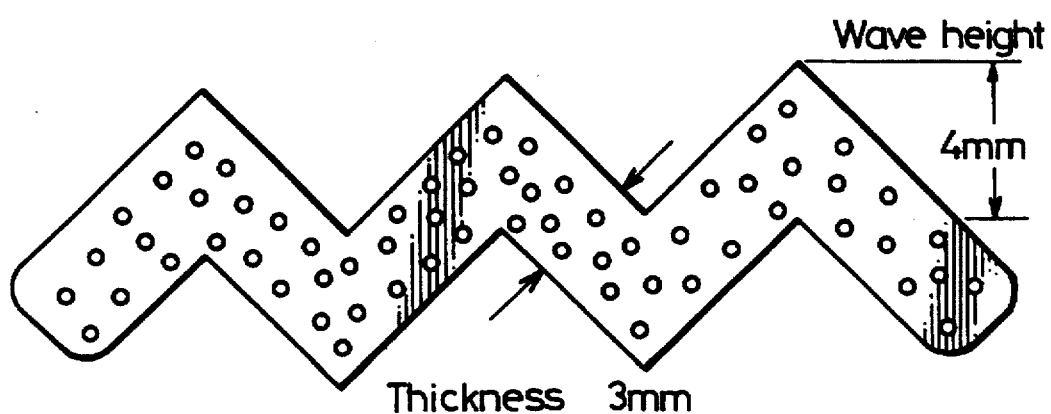
FIG. 4 is vertical side view showing a thick corrugated potato piece together with its actual size.

Potatoes having a specific gravity of 1.080 were selected with use of saline with a specific gravity of 1.080 by the method similar to that described in Example 1. The potatoes were cut to obtain potato pieces having a configuration as shown in FIG. 4. Each of the corrugated potato pieces has a size of 3 mm in thickness and 4 mm in wave-height. The corrugated potato pieces were blanched by dipping the same into hot water kept at 65° C. for 5 minutes. The blanched potato pieces were drained on a net and then subjected to a primary frying treatment by dipping the same into an edible oil kept at 180° C. for 25 seconds. The primary fried potato pieces showed a moisture content of 70% by weight.

The fried potato pieces were frozen by the method as described in Example 1 to obtain frozen products. The frozen products had no problems such as a mutual adhesion of the frozen pieces, adhesion of the frozen piece with a wall of the freezer or the like, so that the yield of the finally fried products could be increased.

The frozen potato pieces were then subjected to a secondary frying treatment by dipping the same into an edible oil kept at 170° C. for 8 minutes. A sampling test on the secondary fried potato pieces showed a moisture content of 11% by weight, no hollow portion and good texture in cross section.

The secondary fried potato pieces were charged into a vacuum dryer previously heated at 100° C. to dry the same until a moisture content thereof becomes 0.5% by weight to obtain final products which can be marketed without a need for refrigeration.

A sampling test of the final products showed a hardness of 2.9 kg-weight, oil content of 33% by weight, no hollow portion therein and uniform texture in cross section, and crispy taste.

The final products were subjected to a functional liking test by a professional panel (10 members). All members have reported that the fried potato products have no excess oily flavor, and that those have crispy and nice taste (Functional score:4.5).

Example 3

Potatoes having a specific gravity of 1.085 were selected by the method similar to that described in Example 1 and cut into pieces having a thick pillar form of 10×50 mm in cross section. The potato pieces were blanched by dipping into hot water kept at 70° C. for 5 minutes.

The blanched potato pieces (moisture content:72% by weight) were primary fried by dipping the same into an edible oil kept at 160° C. for 70 seconds and then the fried potato pieces were immediately frozen by the method as described in Example 1.

The frozen potato pieces were secondary fried by dipping the same in an edible oil kept at 185° C. for 10 minutes. A sampling test of the secondary fried potato pieces showed a moisture content of 11% by weight, no hollow portion therein, and uniform and good texture in cross section.

The secondary fried potato pieces were charged in a vacuum dryer previously heated at 100° C. to dry the same until the moisture content thereof reach 5.0% by weight to obtain final products which can be marketed without a need for refrigeration. A sampling test of the final products showed a hardness of 4.0 kg-weight, oil content of 31% by weight, no hollow portion therein, uniform texture in cross section, and crispy taste.

The final products were subjected to a functional liking test by a professional panel (10 members). All members have reported that the fried potato products have no excess oily flavor, and that those have crispy and nice taste (Functional score:4.5).

Comparative Example 1

Potatoes having a specific gravity of 1.088 were selected by the method similar to that described in Example 1. In accordance with the process as described in Example 1, the potatoes were cut into pieces, blanched, primary fried, frozen, secondary fried, and dried by hot air—microwaves to obtain stick type fried potato products.

The products showed a moisture content of 1.0% by weight to allow marketing without a need for refrigeration and oil content of 31% by weight to feel no excess oily flavor, but have a hardness of 8.0 kg-weight, and thus such an evaluation was given by a professional panel (10 members) that the products are too hard and not having a preferable taste (Functional score:2.5).

Comparative Example 2

Potatoes having a specific gravity of 1.080 were selected and cut into pieces by the method similar to that described in Example 1. The potato pieces were blanched by dipping into hot water kept at 75° C. for 8 minutes.

In accordance with the process as described in Example 1, then, the potato pieces were primary fried, frozen, secondary fried, and dried by hot air—microwaves to obtain stick type fried potato products.

The products showed a moisture content of 1.5% by weight to allow marketing without a need for refrigeration and oil content of 31% by weight to feel no excess oily flavor, but have a hollow inner texture and hardness of 8.0 kg-weight, and thus such an evaluation was given by a professional panel (10 members) that the products are too hard and have a bad taste (Functional score:1.5).

Comparative Example 3

Potatoes having a specific gravity of 1.080 were selected, cut into pieces and blanched by the method similar to that described in Example 1. The blanched potato pieces were primary fried in an edible oil kept at 180° C. for 60 seconds.

In accordance with the process as described in Example 1, then, the fried potato pieces were, frozen, secondary fried, and dried by hot air—microwaves to obtain stick type fried potato products.

The products showed a moisture content of 0.5% by weight to allow marketing without a need for refrigeration and oil content of 33% by weight to feel no excess oily flavor, but have a hollow inner texture and hardness of 10.0 kg-weight, and thus such an evaluation was given by a professional panel (10 members) that the products are too hard and have a remarkable bad taste (Functional score:1.0).

What is claimed is:

1. A process for the manufacture of fried potatoes wherein the fried potatoes can be marketed without a need for refrigeration, which comprises the steps of cutting potatoes into pieces, wherein the potatoes have a specific gravity of 1.070–1.085, blanching the pieces by dipping the same into hot water at a temperature of 60°–70° C. for 5–10 minutes, primary frying the blanched potato pieces in an edible oil at a temperature of 160°–190° C., immediately freezing the fried pieces by exposing the same to a temperature not higher than –20° C., secondary frying the frozen potato pieces in an edible oil at a temperature of 170° to 190° C., and drying the resulting fried pieces to bring their moisture content and oil content to 0.5–5% by weight and 30–35% by weight, respectively.

2. A process as claimed in claim 1, wherein said potato pieces have a square pillar form of 3×3 mm–10×50 mm in cross section or a thick corrugated form of 3–10 mm in thickness and 1–10 mm in wave-height.

3. A process for the manufacture of fried potatoes wherein the fried potatoes can be marketed without a need for refrigeration, which comprises the steps of cutting into pieces washed and pared potatoes having a specific gravity of 1.070–1.085, blanching the potato pieces by dipping the same into hot water at a temperature of 60°–70° C. for 5×10 minutes, primary frying the blanched potato pieces in an edible oil at a temperature of 160°–190° C. to bring their water content to 69–72% by weight, immediately freezing the fried pieces by exposing the same to a temperature not higher than –20° C., secondary frying the frozen pieces in an edible oil at a temperature of 170°–190° C. so as to bring their moisture content to 8–12% by weight, and drying the resulting fried pieces to bring their moisture content and oil content to 0.5–5% by weight and 30–35% by weight, respectively.

4. A process as claimed in claim 3, wherein said potato pieces have a square pillar form of 3×3 mm–10×50 mm in cross section or a thick corrugated form of 3–10 mm in thickness and 1–10 mm in wave-height.

* * * * *